United States Patent
Lee et al.

(10) Patent No.: US 9,531,241 B2
(45) Date of Patent: Dec. 27, 2016

(54) COOLING DEVICE FOR ELECTRIC MOTOR AND ELECTRIC MOTOR

(71) Applicant: FANUC CORPORATION, Yamanashi (JP)

(72) Inventors: SeungJun Lee, Yamanashi (JP); Hidetoshi Uematsu, Yamanashi (JP)

(73) Assignee: Fanuc Corporation, Yamanashi (JP)

( * ) Notice: Subject to any disclaimer, the term of this patent is extended or adjusted under 35 U.S.C. 154(b) by 57 days.

(21) Appl. No.: 14/608,266

(22) Filed: Jan. 29, 2015

(65) Prior Publication Data
US 2015/0222160 A1 Aug. 6, 2015

(30) Foreign Application Priority Data
Jan. 31, 2014 (JP) ................... 2014-017536

(51) Int. Cl.
*H02K 9/04* (2006.01)
*H02K 5/20* (2006.01)
*H02K 9/14* (2006.01)

(52) U.S. Cl.
CPC ...................... *H02K 9/14* (2013.01)

(58) Field of Classification Search
CPC ............. H02K 9/04; H02K 9/06; H02K 9/02; H02K 5/20; H02K 5/22
USPC ......... 310/58, 60 R, 62, 63, 89, 91
See application file for complete search history.

(56) References Cited

U.S. PATENT DOCUMENTS

| 5,747,900 A | * | 5/1998 | Nakamura | H02K 9/16 310/58 |
| 2005/0104458 A1 | * | 5/2005 | Then | H02K 9/14 310/58 |
| 2011/0109176 A1 | * | 5/2011 | Yoshimura | H02K 5/20 310/64 |

FOREIGN PATENT DOCUMENTS

| JP | S59053676 U | 4/1984 |
| JP | S61062544 U | 4/1986 |
| JP | H03239142 A | 10/1991 |
| JP | H09219954 A | 8/1997 |
| JP | H10174368 A | 6/1998 |
| JP | 2004032880 A | 1/2004 |
| JP | 3672124 B2 | 4/2005 |
| JP | 2011101549 A | 5/2011 |

OTHER PUBLICATIONS

English abstract Japanese Publication No. JP 09-201077 A, published Jul. 31, 1997, (no abstract is available for JP 3672124 B2, which is the corresponding granted patent), 1 page.
English Translation of Abstract for Japanese Publication No. 2011101549, published May 19, 2011, 1 page.
English Translation of Japanese Publication No. 2004032880, published Jan. 29, 2004, 10 pages.
English Translation of Abstract for Japanese Publication No. H03239142, published Oct. 24, 1991, 1 page.

(Continued)

*Primary Examiner* — Michael Andrews
(74) *Attorney, Agent, or Firm* — Fredrickson & Byron, P.A.

(57) ABSTRACT

A cooling device for an electric motor, comprising a cover which has a cylindrical-shaped main part which can house the electric motor, and a fan motor which is attached to the main part so as to blow air to the inside of the main part. The cover further has an abutting part which protrudes from an inside periphery of the main part and can abut against the (Continued)

electric motor. The abutting part forms a gap for blowing air between the main part and the electric motor.

3 Claims, 11 Drawing Sheets

(56) References Cited

OTHER PUBLICATIONS

Machine Translation of Japanese Publication No. H10174368, published Jun. 26, 1998, 9 pages.
Machine Translation of Abstract for Japanese Publication No. H09219954, published Aug. 19, 1997, 1 page.
Untranslated Japanese Office Action for Application No. 2014-017536, mailed May 12, 2015, 2 pages.
Machine Translation of Japanese Office for Application No. 2014-017536, mailed May 12, 2015, 5 pages.
Untranslated Notification of Reasons for Refusal for JP Application No. 2014-017536, dated Aug. 4, 2015, 3 pages.
Untranslated Notification of Reasons for Refusal for JP Application No. 2014-017536, dated May 12, 2015, 3 pages.
Translated Notification of Reasons for Refusal for JP Application No. 2014-017536, dated Aug. 4, 2015, 3 pages.
Translated Notification of Reasons for Refusal for JP Application No. 2014-017536, dated May 12, 2015, 3 pages.

* cited by examiner

COOLING DEVICE FOR ELECTRIC MOTOR AND ELECTRIC MOTOR

BACKGROUND OF THE INVENTION

1. Field of the Invention

The present invention relates to a cooling device for an electric motor comprising a fan motor, and an electric motor.

2. Description of the Related Art

Conventionally, in an electric motor provided with a fan motor, cooling of the electric motor is carried out by blowing air from a cooling fan to the inside of a stator through an air vent formed on the stator. In such a cooling structure, the fan motor is often attached by bolts or other joining members to the anti-load side of the electric motor. In relation to this, JP-B-3672124 describes an electric motor which has a motor cover for covering an outer frame of the electric motor, and a fan motor attached to the motor cover. In the electric motor of JP-B-3672124, the fan motor is attached to the electric motor by screwing the motor cover to the outer frame of the electric motor.

In this regard, according to the above in such a cooling structure that has an air vent, the stator is partially exposed through the air vent to the outside of the electric motor, so the reliability of the electric motor may decrease due to adhesion of foreign matter to the stator. For example, if the electric motor is assembled into various machining systems, the cutting fluid used during machining can enter inside the electric motor and adhere to the stator. Further, according to a fastening structure where the fan motor is fastened to the electric motor by bolts or other joining members, vibration of the load apparatus in the machining system is directly transmitted through the electric motor to the fan motor, and therefore the fan motor may be damaged by the vibration. More specifically, the fan motor usually has a resonant frequency unique to the model, so if the resonant frequency is included in the frequency range of the vibration of the load apparatus, the fan motor may suffer a fatigue fracture.

Note that in order to improve the vibration absorbing performance of a fan motor in the mounting structure such as in JP-B-3672124, there is no option but to interpose a vibration absorbing member between the fan motor and the electric motor. However, this will substantially restrict the degree of freedom of design of the electric motor. Furthermore, if bolts, screws, etc., are used to mount a fan motor to an electric motor, a lot of time and trouble are required for attaching/detaching the fan motor to/from the electric motor. Therefore, it will be difficult for the operator to detach a fan motor from one electric motor and then reattach the fan motor to another electric motor.

A cooling device for an electric motor which can prevent vibration which is transmitted from an electric motor from causing damage to the fan motor has been sought.

SUMMARY OF THE INVENTION

According to the first aspect of the present invention, there is provided a cooling device for an electric motor, comprising a cover which has a cylindrical-shaped main part which can house the electric motor, and a fan motor which is attached to the main part so as to blow air to the inside of the main part, wherein the cover further has an abutting part which protrudes from an inside surface of the main part and can abut against the electric motor, and the abutting part forms a gap for blowing air between the main part and electric motor.

According to the second aspect of the present invention, there is provided a cooling device for an electric motor according to the first aspect, wherein the abutting part has a hollow part which forms an air blowing path of the fan motor.

According to the third aspect of the present invention, there is provided a cooling device for an electric motor according to the first or second aspect, wherein the abutting part is formed integrally with the main part.

According to the fourth aspect of the present invention, there is provided a cooling device for an electric motor according to the first or second aspect, wherein the abutting part is formed from a vibration absorbing material.

According to the fifth aspect of the present invention, there is provided a cooling device for an electric motor according to any one of the first to fourth aspects, wherein the main part comprises a first component which corresponds to part of the cylindrical shape in the circumferential direction, and a second component which is detachable from the first component corresponds to the remaining part of the cylindrical shape in the circumferential direction, and the abutting part is provided on both the first component and the second component.

According to the sixth aspect of the present invention, there is provided a cooling device for an electric motor, according to any one of the first to fifth aspects further comprising a connector which is attached to the main part of the cover, wherein the connector has a soldered part which joins an end part of a lead wire extending from the fan motor, to the connector, an insulating tube for covering the soldered part, and an insulating material part for further covering the insulating tube.

According to the seventh aspect of the present invention, there is provided a cooling device for an electric motor according to any one of the first to sixth aspects, further comprising a connector which is attached to the main part of the cover wherein the connector has a soldered part which joins an end part of a lead wire extending from the fan motor, to the connector, and the main part has a wall part which isolates the soldered part from the air blowing part of the fan motor.

According to the eighth aspect of the present invention, there is provided an electric motor comprising a cooling device according to any one of the first to seventh aspects.

DETAILED DESCRIPTION OF EMBODIMENTS

Below, an embodiment of the present invention will be explained in detail with reference to the drawings. Note that, the following description does not limit the technical scope, meanings of terms, etc. of the invention which is described in the claims.

Figure 1:
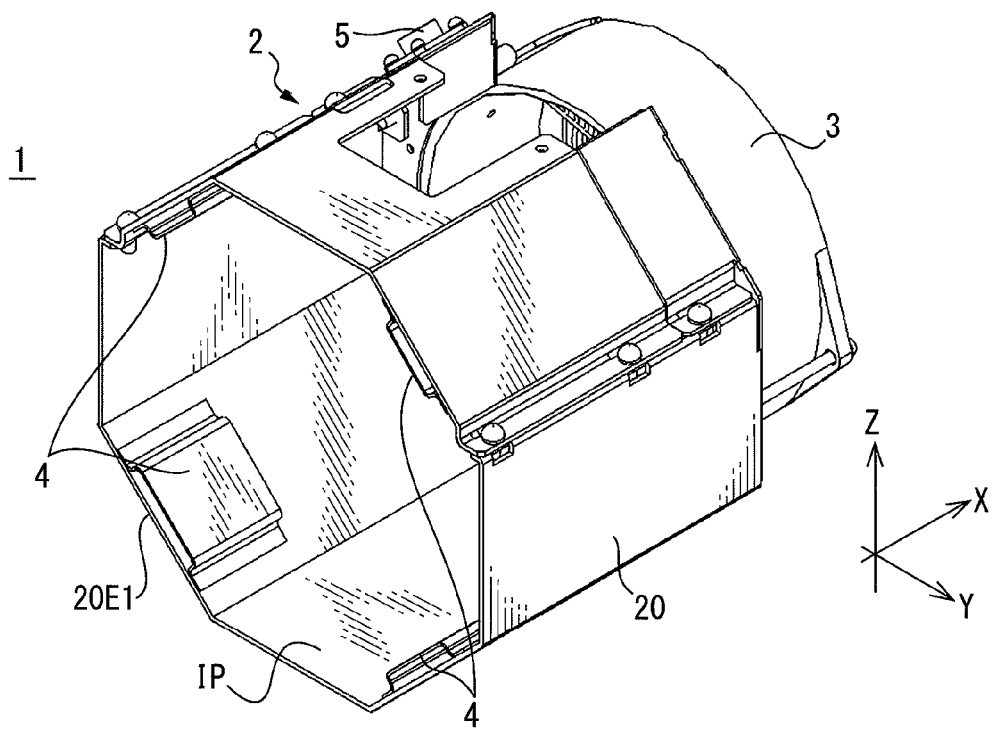
FIG. 1 is a perspective view which shows a cooling device of one embodiment of the present invention.

Referring to FIG. 1 to FIG. 19, a cooling device of one embodiment of the present invention will be explained. FIG. 1 is a perspective view which shows a representative cooling device 1 of the present embodiment. As shown in FIG. 1, the cooling device 1 of the present example comprises a cover 2 which has a cylindrical-shaped main part 20 which can house an electric motor, and a fan motor 3 which is attached to the main part 20 so as to blow air to the inside of the main part 20. Further, the cover 2 of this example comprises a plurality of abutting parts 4 which protrude from the inside periphery IP of the main part 20 and can abut against the outside periphery of the electric motor. More specifically, the cover 2 of the present example has four abutting parts 4 which are provided in the vicinity of one of the peripheral edge parts 20E1 of the main part 20. These abutting parts 4 are arranged at intervals in the circumferential direction of the main part 20. Below, the circumferential direction of the cylindrical-shaped main part 20 may be simply referred to as the "circumferential direction", and the radial direction of the cylindrical-shaped main part 20 may be simply referred to as the "radial direction". Further, the cooling device 1 of the present example comprises a connector 4 which is connected to a power source (not shown) which supplies power to the fan motor 3. As shown in FIG. 1, the connector 5 of the present example is attached to the main part 20 of the cover 2 of the cooling device 1. Note that, in FIG. 1, the height direction of the cylindrical-shaped main part 20 is defined as X-direction, the vertical direction in the figure is defined as Z-direction, and the direction vertical to both X- and Y-directions is defined as Y-direction. X-, Y-, and Z-directions in the other figures express the same directions as these.

Figure 2:
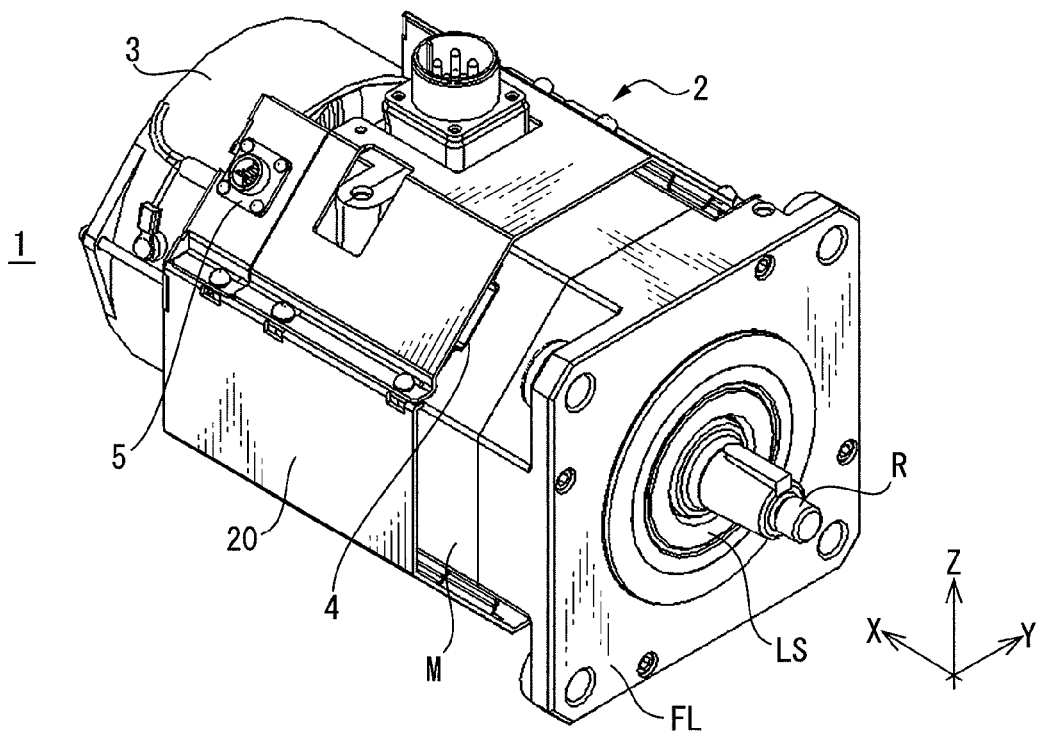
FIG. 2 is a perspective view which shows a state of the cooling device of FIG. 1 attached to an electric motor.

FIG. 2 is a perspective view which shows the state where the cooling device 1 of FIG. 1 is attached to the electric motor M. The electric motor M of the present example is a rotary type motor which outputs driving power caused by interaction of the rotor and stator in the form of rotational motion of the drive shaft R. The electric motor M generates heat during operation, so the cooling device 1 cools the electric motor M by blowing air from the fan motor 3 toward the electric motor. Note that, the heat generated by the electric motor M is mainly due to the copper loss, iron loss, and other electrical loss which occurs at the stator as well as the mechanical loss due to friction which acts on the rotor. As shown in FIG. 2, the lateral surface LS on the load side of the electric motor M of the present example is provided with a flange part FL for attaching the electric motor M to various load apparatuses (not shown). The drive shaft R which sticks out from the lateral surface LS on the load side of the electric motor M is connected to the driven shaft of the load apparatus.

Figure 3:
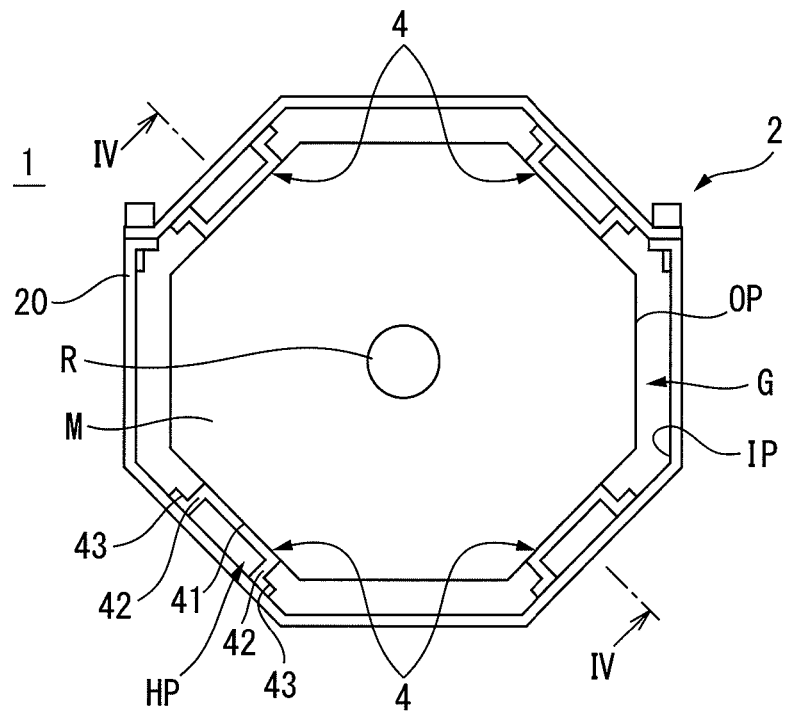
FIG. 3 is a front view of the cooling device in the state of FIG. 2 as seen from the load side of the electric motor.
Figure 4:
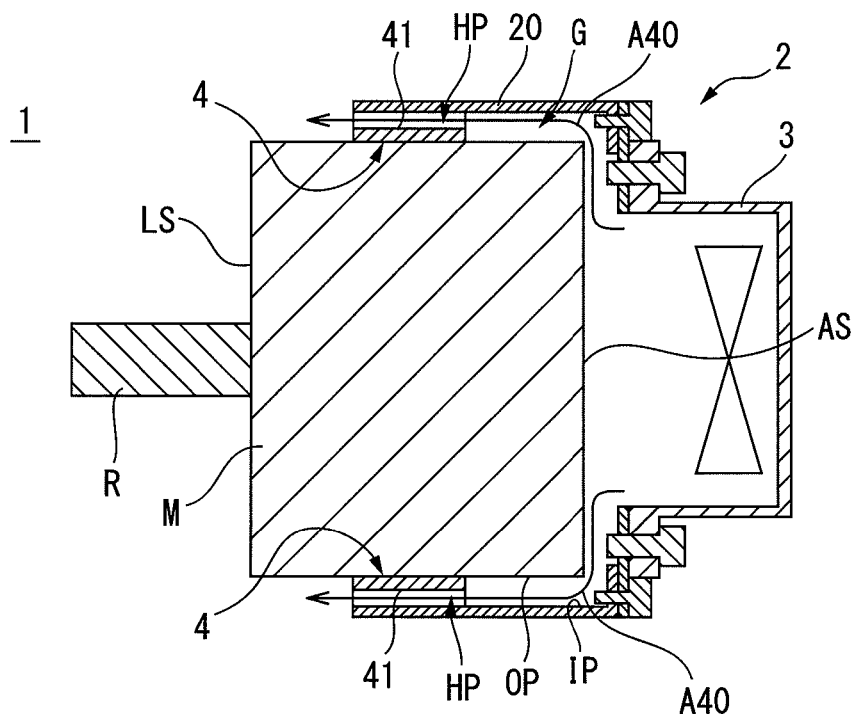
FIG. 4 is a cross-sectional view along the line IV-IV of FIG. 3.

FIG. 3 is a schematic front view of the cooling device 1 in the state of FIG. 2 as seen from the load side of the electric motor M, while FIG. 4 is a cross-sectional view along the line IV-IV of FIG. 3. In FIG. 3 and FIG. 4, for convenience, the flange part FL of the electric motor M is omitted. As shown in FIG. 3 and FIG. 4, the main part 20 of the cover 2 has inside dimensions which are larger than the outside dimensions of the electric motor M so as to enable the electric motor M to be housed. Further, the abutting parts 4 of the cover 2 can abut against the electric motor M so as to form a gap G for blowing air between the main part 20 and the electric motor M. That is, the cooling air generated by the fan motor 3 passes through the gap G and flows out to the outside of the main part 20. As shown in FIG. 3, the electric motor M of the present example has a prismatic outside shape (more specifically an octagonal prismatic shape) which extends in parallel with the drive shaft R. The main part 20 of the cover 2 has a prismatic inside shape similar to the electric motor M. Further, between the main part 20 of the cover 2 and the electric motor M, four abutting parts with the same dimensions and shape are arranged at equal intervals, so the main part 20 and the electric motor M are arranged substantially concentrically.

As shown in FIG. 3, each of the abutting parts 4 of the cover 2 according to the present example has a contact part 41 which can make a surface contact with the outside periphery OP of the electric motor M, a pair of side wall parts 42 which extend from the two end parts of the contact part 41 in the circumferential direction toward the inside periphery IP of the main part 20, and a pair of flange parts 43 which extend outward in the circumferential direction from the forward ends of the pair of side wall parts 42. That is, each abutting part 4 of the present example has a hat-shaped cross section in the plane perpendicular to the height direction of the main part 20. In this way, the abutting part 4 of the cover 2 according to the present example has a hollow part HP which is positioned at the opposite side of the electric motor M across the contact part 41. This hollow part HP forms part of the blowing path of the fan motor 3 (see FIG. 4 as well). The abutting part 4 of the cover 2 according to the present example, for example, may be formed separately from the main part 20 by bending various metal materials, and then welded or bonded at the pair of flange parts 43 to the inside periphery IP of the main part 20

Further, as shown in FIG. 4, the fan motor 3 of the present example is attached to the main part 20 of the cover 2 so as to anti-load side lateral surface AS of the electric motor M. Due to this, the cooling air of the fan motor 3 flows from the anti-load side lateral surface AS of the electric motor M toward the load side lateral surface LS when passing through the air blowing gap G, as shown by the arrow mark A40. However, the position of attachment of the fan motor 3 in the main part 20 of the cover 2 is not necessarily limited to the example of FIG. 4. The fan motor 3 may also be attached to the main part 20 of the cover 2 so as to face the outside periphery OP of the electric motor M, for example.

As explained above, in the cooling device 1 of the present example, the fan motor 3 is attached to the electric motor M by means of the main part 20 of the cover 2 which houses the electric motor M, and the abutting parts 4 which form the gap G for blowing air between the main part 20 and the electric motor M. Therefore, according to the cooling device 1 of the present example, it is possible to prevent vibration of the electric motor M from being directly transmitted to the fan motor 3, so it is possible to prevent vibration of the electric motor M from causing damage to the fan motor 3. In particular, even if the frequency band of the vibration which is transmitted from a load apparatus to the electric motor M includes the inherent resonant frequency of the fan motor 3, it is possible to prevent that vibration from causing a fatigue failure of the fan motor 3.

Figure 5:
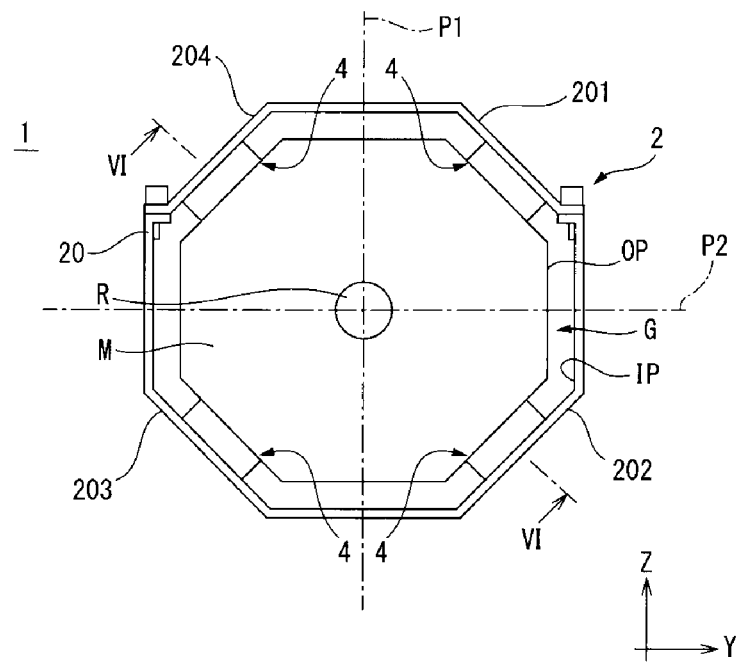
FIG. 5 is a front view similar to FIG. 3 which shows a cooling device of the present embodiment where a variation of the abutting part is employed.
Figure 6:
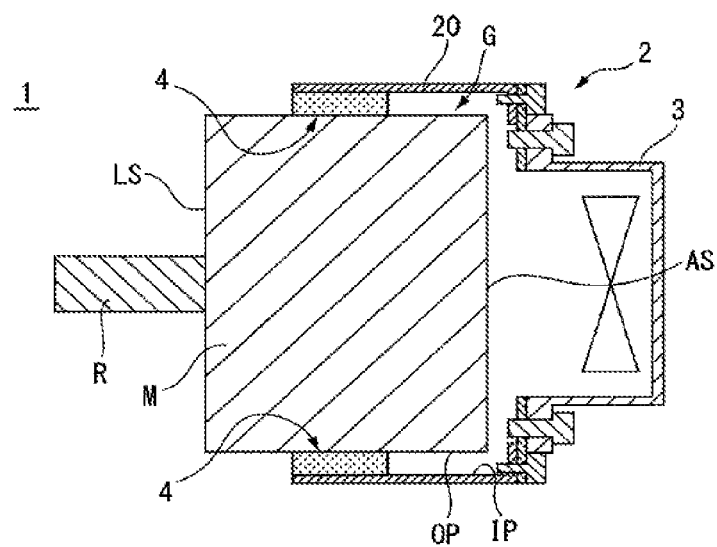
FIG. 6 is a cross-sectional view along the line VI-VI of FIG. 5.

Next, a variation of the abutting part 4 in the cover 2 of the cooling device 1 of the present embodiment will be explained. FIG. 5 is a front view similar to FIG. 3 and shows a cooling device 1 where the abutting part 4 according to the present example is employed. Further, FIG. 6 is a cross-sectional view along the line VI-VI of FIG. 5. In FIG. 5 and FIG. 6, in the same way as FIG. 3 and FIG. 4, the flange part FL of the electric motor M is omitted. The cooling device 1 of the present example employs abutting parts 4 which are formed from various vibration absorbing materials, for example, vibration absorbing rubber. As shown in FIG. 5 and FIG. 6, the layout of the abutting parts 4 at the cover 2 of the cooling device 1 of the present example is similar to those illustrated in FIG. 3 and FIG. 4. Therefore, the cooling device 1 of the present example ensures that vibration M of the electric motor M is absorbed by the abutting parts 4, so it is possible to suppress propagation of vibration from the electric motor M to the fan motor 3. In the same way as the abutting parts 4 illustrated in FIG. 3 and FIG. 4, the abutting parts 4 of the present example can also have hollow parts which form part of the air blowing path of the fan motor 3. Note that, the abutting parts 4 of the present example may be bonded to at least one of the inside periphery IP of the main part 20 of the cover 2 and the outside periphery OP of the electric motor M. As shown in FIG. 5, the abutting part 4 is provided on each of four sections 201-204 of the main part 20 which are defined by a first virtual plane P1 which includes an axis line of the drive shaft R and is parallel to the Z-direction, and a second virtual plane P2 which includes the axis line of the drive shaft R and is perpendicular to the first virtual plane P1. The plurality of abutting parts 4 are arranged symmetrically with the first virtual plane P1 and with the second virtual plane P2.

Figure 7:
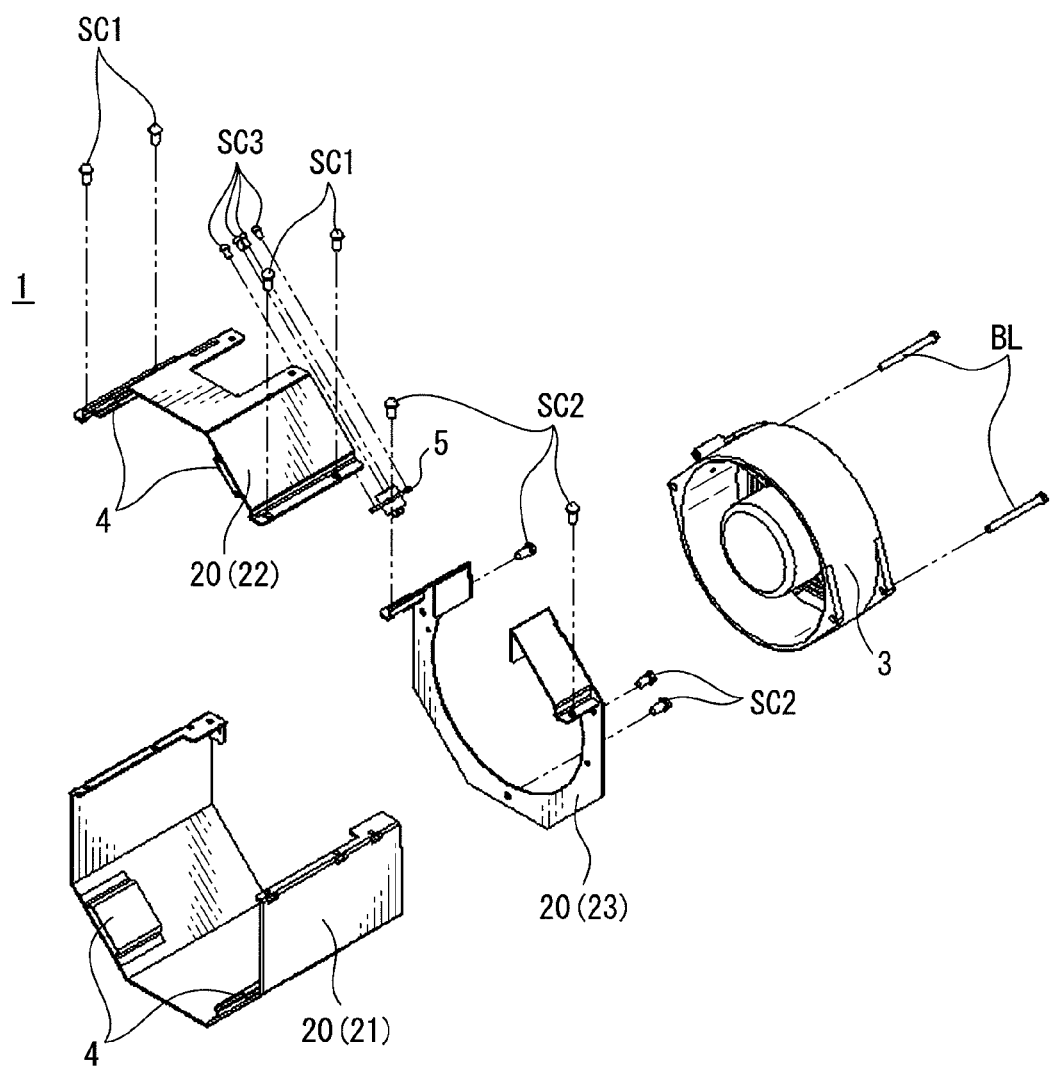
FIG. 7 is an exploded perspective view of the cooling device of FIG. 1.

Referring to FIG. 7, the more detailed structure of the cooling device 1 of the present embodiment will be explained. FIG. 7 is an exploded perspective view of the cooling device 1 of FIG. 1. As shown in FIG. 7, the main part 20 of the cover 2 in the cooling device 1 of the present example comprises a first component 21 which corresponds to one part of the cylindrical shape in the circumferential direction, and a second component 22 which corresponds to the remaining part of the cylindrical shape in the circumferential direction. As shown in FIG. 7, the second component 22 is joined with the first component 21 by four screws SC1. Further, the main part 20 of the cover 2 of the present example includes a third component 23 which is arranged between the first component 21 and the fan motor 3. The third component 23 is formed with an opening part OP for blowing air which has a corresponding shape to the fan motor 3. As shown in FIG. 7, the third component 23 is joined by five screws SC2 to the first component 21, while the fan motor 3 is joined by two bolts BL to the third component 23. That is, the third component 23 functions as a mounting part for mounting the fan motor 3 to the first component 21. Further, as shown in FIG. 7, the connector 5 of the present example is joined by four screws SC3 to the third component 23. In this way, the components of the cooling device 1 of the present example are assembled by screws or bolts in a detachable manner. In particular, the first component 21 and the second component 22 in the cover 2 of the cooling device 1 according to the present example can be easily assembled and disassembled by the four screws SC1. Due to this, process of attaching the cooling device 1 can be simplified. This process will be described later. Note that, the first component 21 and the second component 22 of the cover 2 of the present example are respectively provided with two abutting parts 4.

Figure 8:
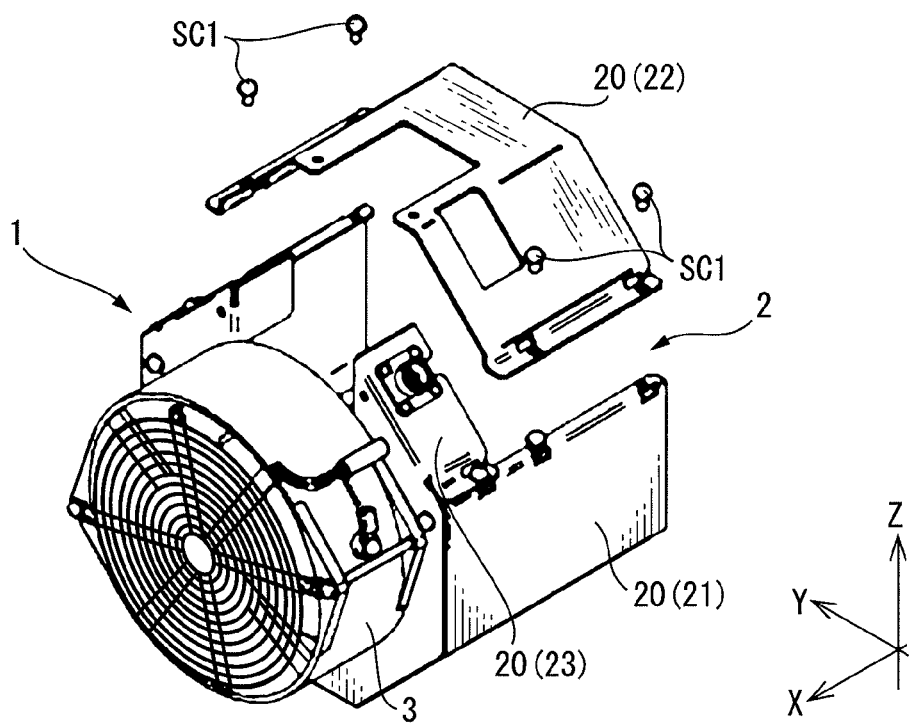
FIG. 8 is a first diagram for explaining a process of attaching the cooling device of the present embodiment to an electric motor.
Figure 9:
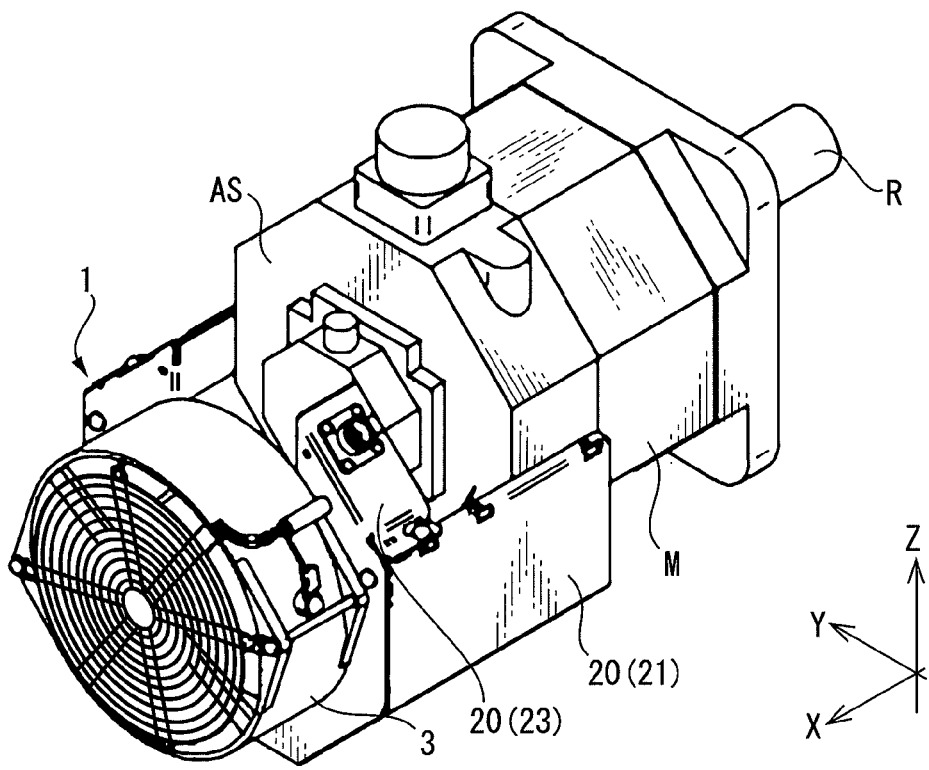
FIG. 9 is a second diagram for explaining a process of attaching the cooling device of the present embodiment to an electric motor.
Figure 10:
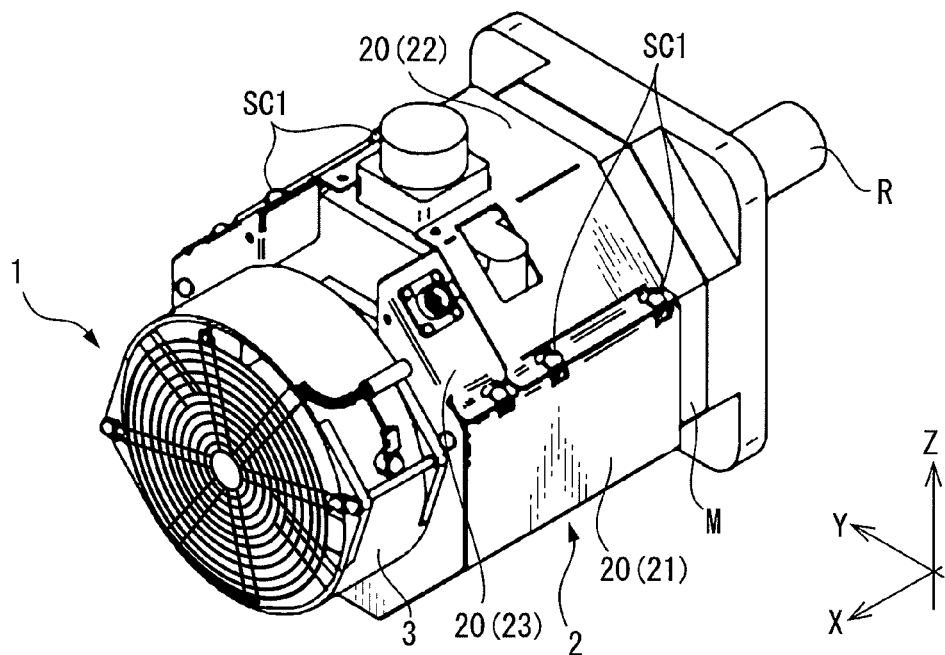
FIG. 10 is a third diagram for explaining a process of attaching the cooling device of the present embodiment to an electric motor.

FIG. 8 to FIG. 10 are diagrams for explaining the process of attaching the cooling device 1 of the present embodiment to the electric motor M. FIG. 8 is a perspective view which shows the state before the cooling device 1 is attached to the electric motor M. As shown in FIG. 8, in the attachment process of the present example, first, the four screws SC1 which join the first component 21 and the second component 22 of the cover 2 are detached. Next, the second component 22 of the cover 2 is detached from the first component 21. Due to this, the inside space of the first component 21 is exposed, so the electric motor M can be easily placed in the inside space of the first component 21. Next, as shown in FIG. 9, the electric motor M is placed in the inside space of the first component 21, whereby the abutting parts 4 of the first component 21 abut against the electric motor M. Next, the electric motor M is moved in the X-direction, whereby the electric motor M is positioned so that the anti-load side lateral surface AS of the electric motor M adjoins the fan motor 3. Next, as shown in FIG. 10, the second component 22 and the four screws SC1 are arranged with respect to the first components 21, and these screws SC1 are fastened by a predetermined fastening torque (for example, 8 Nm) whereby the second component 22 is again attached to the first component 21. Due to this, a predetermined contact surface pressure acts on the outside periphery OP of the electric motor M from the abutting parts 4 of the first component 21 and the second component 22 of the cover 2, so the cover 2 of the cooling device 1 is fastened to the electric motor M.

Figure 11:
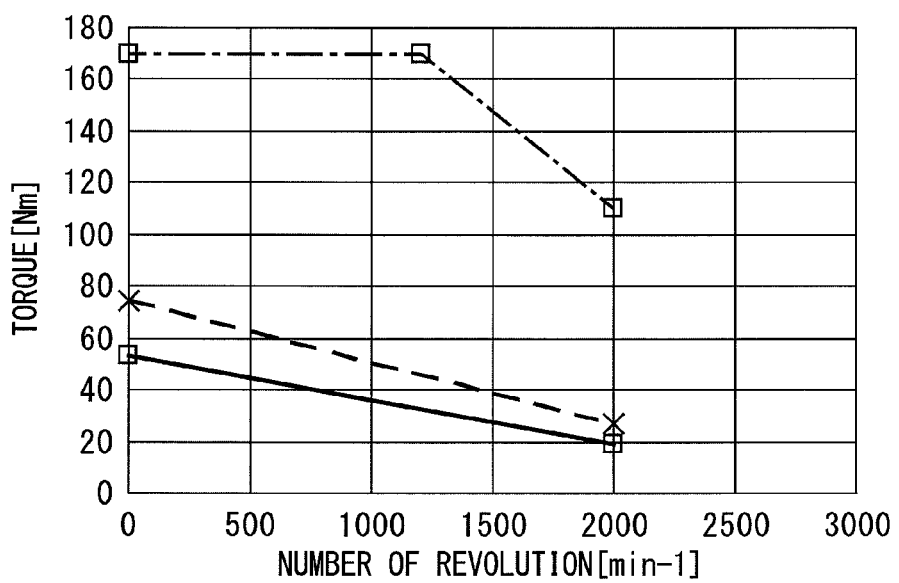
FIG. 11 is a graph which shows torque characteristics of an electric motor before and after attachment of a cooling device of the present embodiment.

In the above way, the cooling device 1 of the present example can be easily attached to the electric motor by screwing the second component 22 of the cover 2. Therefore, the user can easily detach the cooling device 1 from an electric motor and then reattach the cooling device 1 to another electric motor. Due to this, it is possible to improve the torque characteristic of the electric motor to which the cooling device 1 is newly attached. FIG. 11 is a graph which shows the torque characteristic of an electric motor M before and after attachment of the cooling device 1 of the present example. The solid line in FIG. 11 shows the continuous rated torque before attachment of the cooling device 1, while the broken line in FIG. 11 shows the continuous rated torque after attachment of the cooling device 1. Note that, the one-dot chain line in FIG. 11 shows the maximum torque of the electric motor M. As will be understood from a comparison of the solid line and broken line of FIG. 11, the continuous rated torque (broken line) after attachment of the cooling device 1 is about 1.4 to 1.5 times the continuous rated torque (solid line) before attachment of the cooling device 1 in all revolution ranges. In this way, the torque characteristic of the electric motor M is greatly improved by the cooling device 1. Therefore, it is possible to use an existing electric motor M with a cooling device 1 attached thereto, instead of purchasing a new electric motor, even if a better torque characteristic is required by a load apparatus, for example. In general, a cooling device is cheaper than the main body of the electric motor, so the option of using an existing electric motor M with a cooling device 1 attached thereto is extremely advantageous cost-wise.

Figure 12:
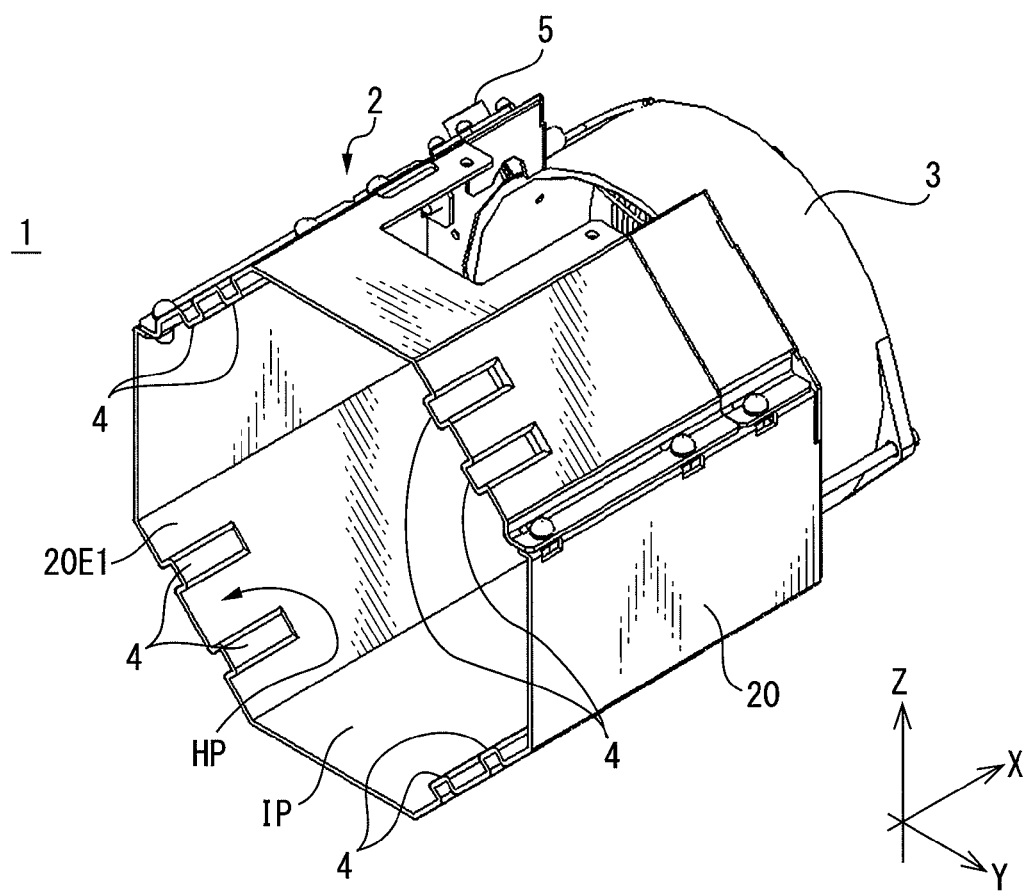
FIG. 12 is a perspective view similar to FIG. 1 which shows a cooling device of the present embodiment where a first variation of the cover is employed.

Next, a first variation of the cover 2 of the cooling device 1 of the present embodiment will be explained. FIG. 12 is a perspective view similar to FIG. 1 and shows a cooling device 1 where the cover 2 according to the present example is employed. As shown in FIG. 12, the abutting parts 4 in the cover 2 of the present example are formed integrally with the main part 20 by dimpling the main part 20. By employing the abutting parts 4, which are formed integrally with the main part 20 in this way, it is possible to eliminate a need for the step of forming the abutting parts 4 separately from the main part 20 by bending a metal material, and the step of joining the abutting parts 4 to the main part 20 by welding or bonding, so it is possible to simplify the production process of the cover 2. Note that, the main part 20 of the cover 2 according to the present example is formed with four sets of abutting parts 4 which are arranged at intervals in the circumferential direction. Each of these sets includes two mutually adjoining abutting parts 4. That is, the main part 20 of this example is formed with a total of eight abutting parts 4. As shown in FIG. 12, mutually adjoining two abutting parts 4 have a hollow part HP in the region sandwiched between them. This hollow part HP forms part of the air blowing path of the fan motor 3, in the same way as the hollow part HP which is illustrated in FIG. 3 and FIG. 4.

Figure 13:
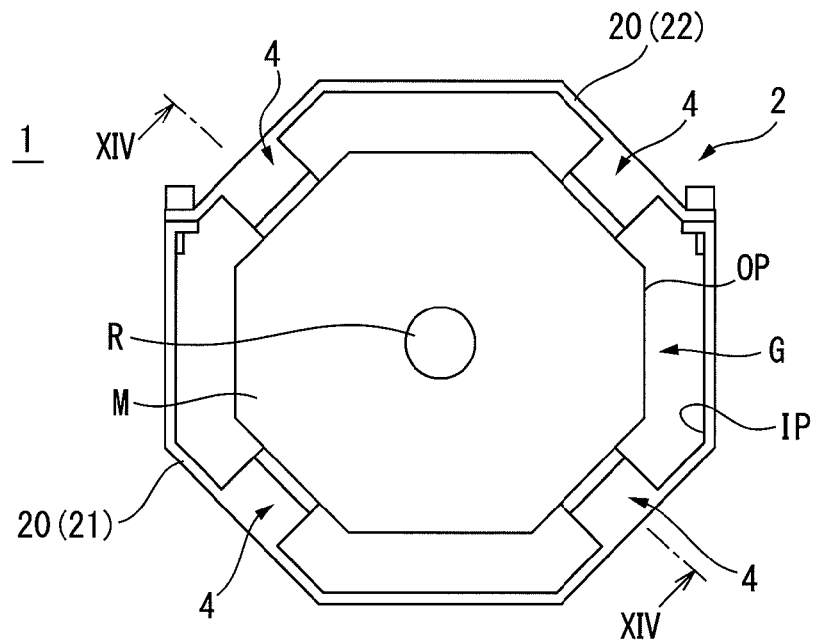
FIG. 13 is a front view similar to FIG. 3 which shows a cooling device of the present embodiment where a second variation of the cover is employed.
Figure 14:
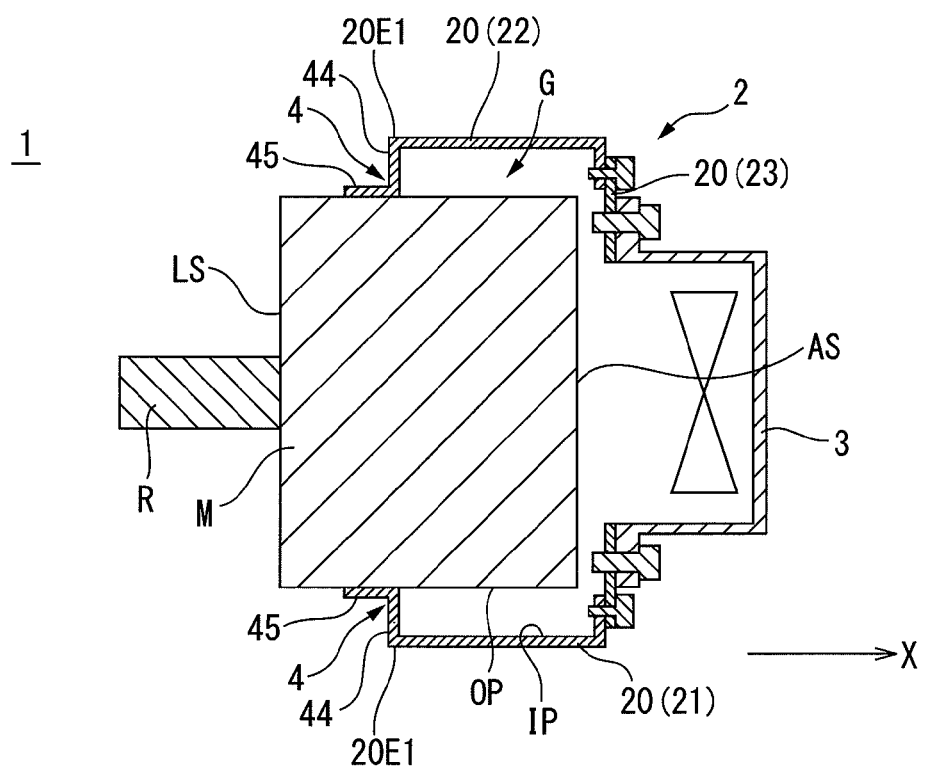
FIG. 14 is a cross-sectional view along the line XIV-XIV of FIG. 13.

Next, a second variation of the cover 2 of the cooling device 1 of the present embodiment will be explained. FIG. 13 is a front view similar to FIG. 3 and shows a cooling device 1 where the cover 2 according to the present example is employed. Further, FIG. 14 is a cross-sectional view along the line XIV-XIV of FIG. 13. In FIG. 13 and FIG. 14, in the same way as FIG. 3 and FIG. 4, the flange part FL of the electric motor M is omitted. As shown in FIG. 13 and FIG. 14, the main part 20 of the cover 2 according to the present example is formed with four abutting parts 4 which are arranged at intervals in the circumferential direction. Each abutting part 4 has a projecting part 44 which projects inward in the radial direction from the inside periphery IP at the peripheral edge part 20E1 of the main part 20, and an extending part 45 which extends from the forward end of the projecting part 44 in the opposite direction of the X-direction to make a surface contact with the outside periphery OP of the electric motor M. Two abutting parts 4 are provided at each of the first component 21 and the second component 22 of the main part 20. For example, the respective abutting parts 4 may be formed integrally with the first component 21 and the second components 22 by bending various metal materials. In the cover 2 of the present example as well, it is possible to prevent vibration of the electric motor M from being directly transmitted to the fan motor 3, so it is possible to prevent vibration of the electric motor M from causing damage to the fan motor 3.

Figure 15:
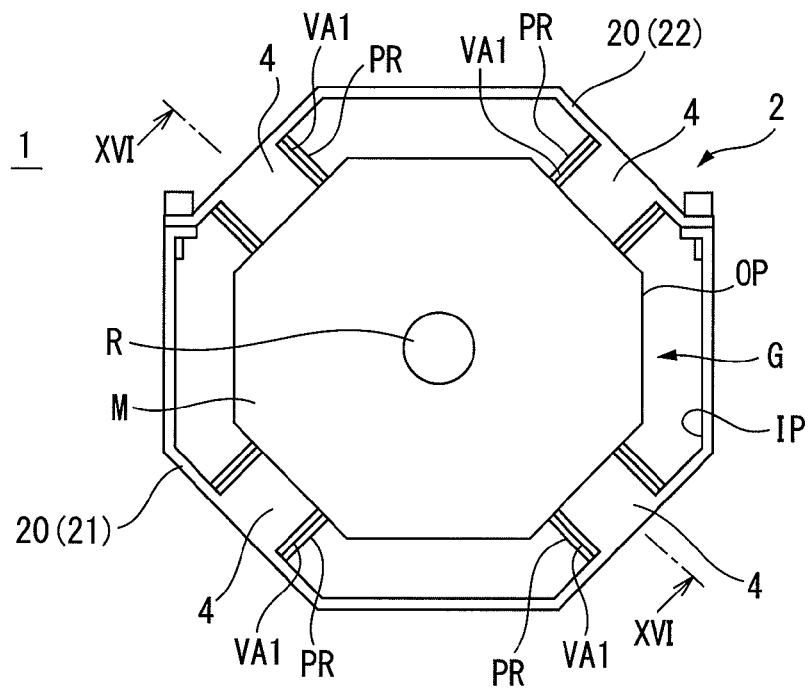
FIG. 15 is a front view similar to FIG. 3 which shows a cooling device of the present embodiment where a third variation of the cover is employed.
Figure 16:
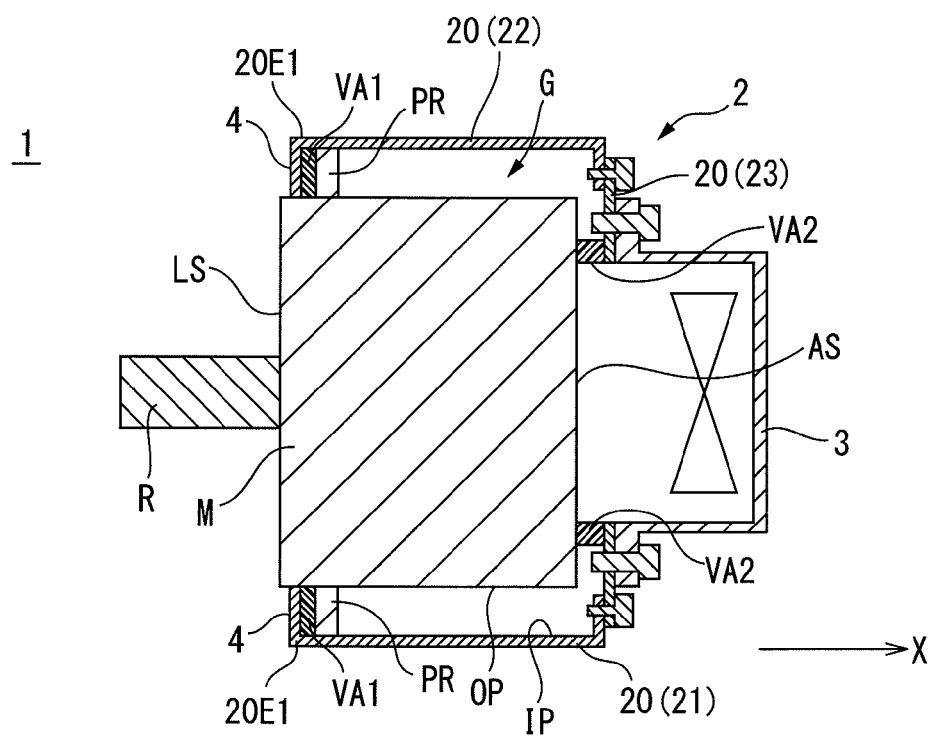
FIG. 16 is a cross-sectional view along the line XVI-XVI of FIG. 15.

Next, a third variation of the cover 2 of the cooling device 1 of the present embodiment will be explained. FIG. 15 is a front view similar to FIG. 3 and shows a cooling device 1 where the cover 2 of the present example is employed. Further, FIG. 16 is a cross-section along line XVI-XVI of FIG. 15. In FIG. 15 and FIG. 16, in the same way as FIG. 3 and FIG. 4, the flange part FL of the electric motor M is omitted. As shown in FIG. 15 and FIG. 16, the main part 20 of the cover 2 according to the present example is formed with four abutting parts 4 which are arranged at intervals in the circumferential direction. These abutting parts 4 project inward in the radial direction from the inside periphery IP at the peripheral edge part 20E1 of the main part 20. Two abutting parts 4 are provided at each of the first component 21 and the second component 22 of the main part 20. For example, they can be formed integrally with the first component 21 and the second component 22 by bending various metal materials.

As shown in FIG. 15, the outside periphery OP of the electric motor M of the present example is provided with four projecting parts PR which have positions corresponding to the abutting parts 4 and protrude toward the inside periphery IP of the main part 20. The positions of these projecting parts PR in the circumferential direction coincide with the positions of the abutting parts 4 at the cover 2 in the circumferential direction. Further, as shown in FIG. 16, each projecting part PR of the electric motor M is separated from each abutting part 4 of the cover 2 by a predetermined distance in the X-direction. Between each projecting part PR and abutting part 4, a first vibration absorbing member VA1 is provided. Each first vibration absorbing member VA1 according to the present example is formed from a vibration absorbing material such as vibration absorbing rubber, and is bonded to at least one of the abutting part 4 of the cover 2 and the projecting part PR of the electric motor M. Further, as shown in FIG. 16, the lateral surface AS on the anti-load side of the electric motor M is separated from the third component 23 of the cover 2 by a predetermined distance in the opposite direction of the X-direction. Between the lateral surface AS and the third component 23, a plurality of second vibration absorbing members VA2 are arranged at intervals in the circumferential direction. Each second vibration absorbing member VA2 according to the present example is formed from a vibration absorbing material such as vibration absorbing rubber, and is attached to at least one of the third component 23 of the cover 2 and the lateral surface AS of the electric motor M. In the cover 2 of the present example as well, it is possible to prevent vibration of the electric motor M from being directly transmitted to the fan motor 3, so it is possible to prevent vibration of the electric motor M from causing damage to the fan motor 3. Furthermore, in the present example, the vibration of the electric motor M is absorbed by the first and the second vibration absorbing members VA1 and VA2, propagation of vibration from the electric motor M to the fan motor 3 can be suppressed.

Figure 17:
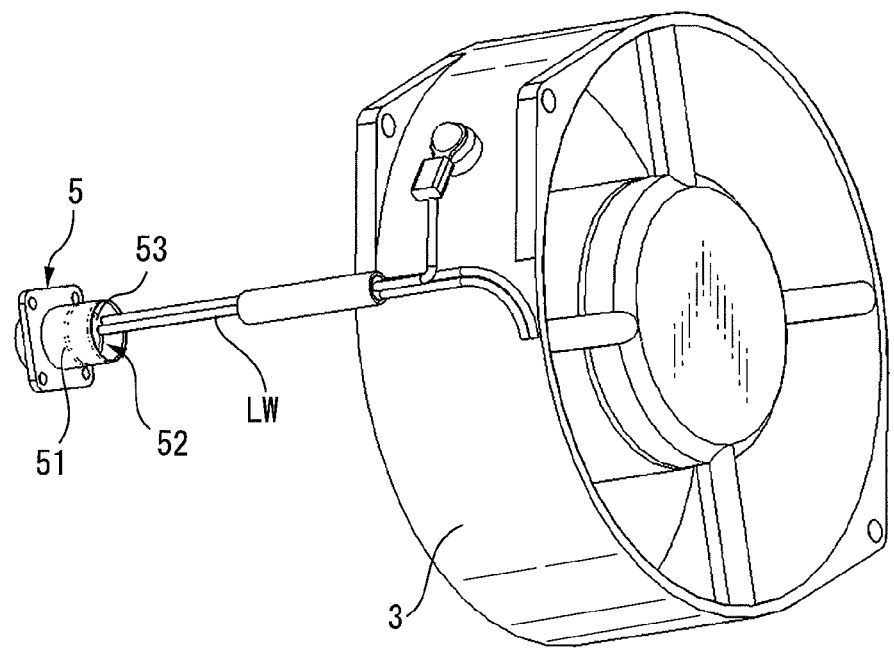
FIG. 17 is an enlarged perspective view which shows a connector in the cooling device of FIG. 1 together with the fan motor.

Next, the structure of the connector 5 in the cooling device 1 of the present embodiment will be explained in detail. FIG. 17 is an enlarged perspective view which shows the connector 5 in the cooling device 1 of FIG. 1 along with the fan motor 3. As shown in FIG. 17, the end part 51 of the connector 5 on the fan motor 3 side is provided with a recessed part 52 which can hold the forward end of the lead wire LW which extends from the fan motor 3. The forward end of the lead wire LW is bonded by soldering to the conductive part which is positioned at the bottom surface of the recessed part 52. Here, the soldered part for joining the lead wire LW and the connector 5 can be covered by an insulating tube (not shown) such as a heat shrinkable tube. In this regard, if the electric motor M of the present example is assembled into various machining systems, the cutting fluid used during machining may take the form of a mist, and enter the inside of the cooling device 1. Further, under a more stringent environment, the cutting fluid may enter the cooling device 1 even in the form of a liquid. Therefore, the connector 5 of the present example is provided with an insulating material part 53 which is filled in the recessed part 52 so as to occupy part or all of the recessed part 52. The insulating material part 53 can be formed from various resin materials. Due to this, the soldered part covered by the insulating tube is further covered by the insulating material part 53, so it is possible to prevent insulation degradation of the fan motor 3 caused by the cutting fluid, and as a result it is possible to improve the reliability of the fan motor 3.

Figure 18:
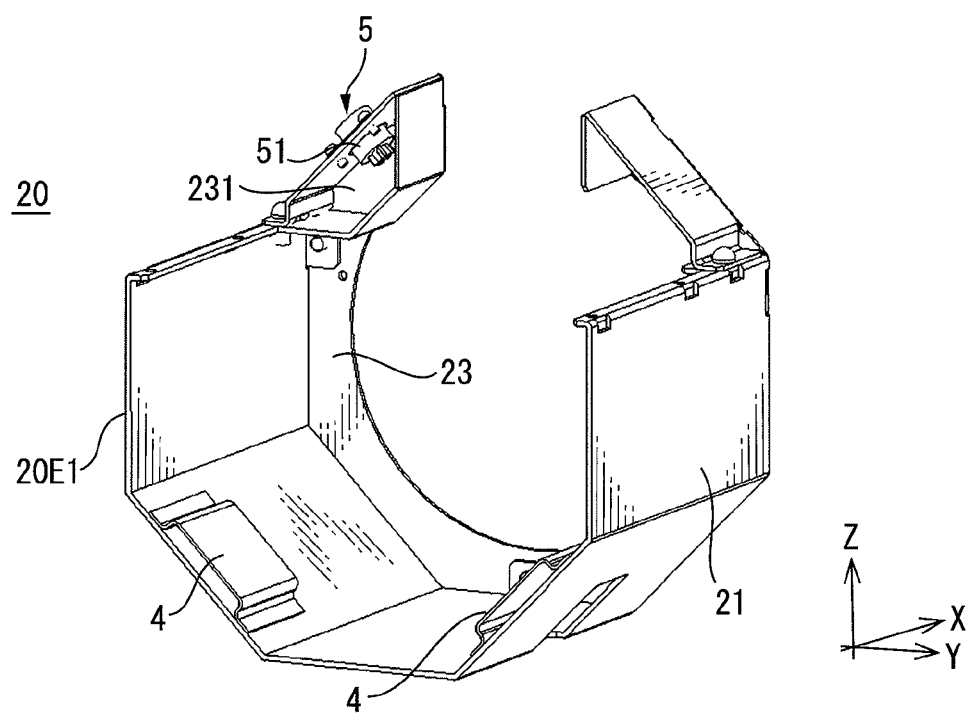
FIG. 18 is a perspective view of a main part of a cover in a cooling device of the present embodiment as seen from the side of one peripheral edge.
Figure 19:
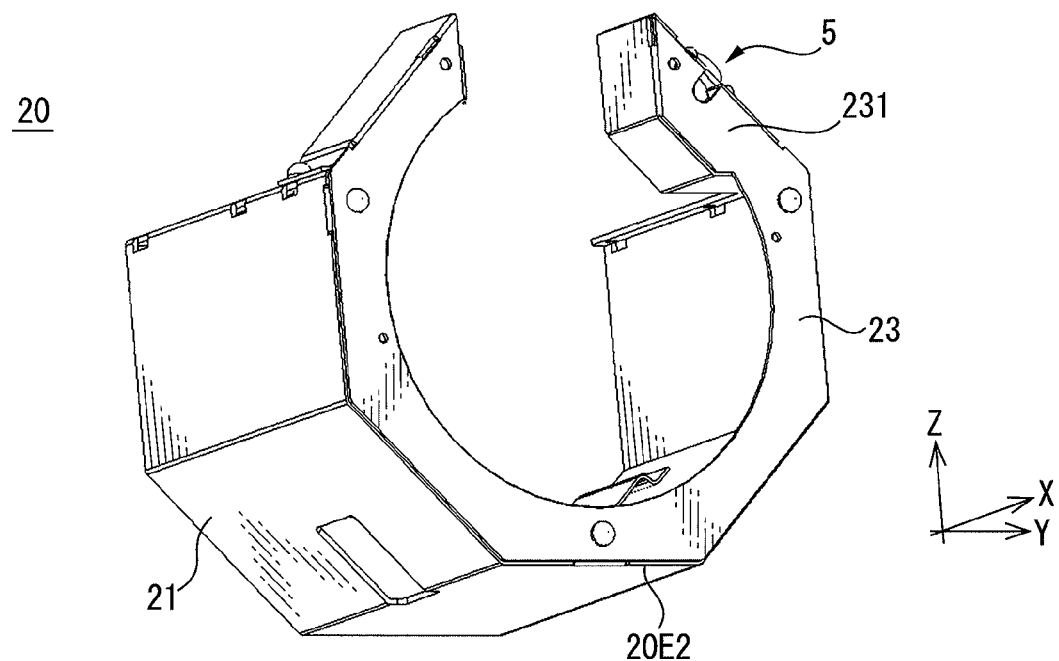
FIG. 19 is a perspective view of a main part of a cover in a cooling device of the present embodiment as seen from the side of the other peripheral edge.

Further, the main part 20 of the cover 2 in the cooling device 1 of the present example is provided with an additional structure for preventing the above-mentioned insulation degradation of the fan motor 3 caused by cutting fluid. FIG. 18 is a perspective view of the main part 20 of the present example as seen from the side of one peripheral edge part 20E1, while FIG. 19 is perspective view of the main part 20 of the present example as seen from the side of the other peripheral edge part 20E2. As explained above, the fan motor 3 is attached to the other peripheral edge part 20E2 by means of the third component 23. For convenience, in FIG. 18 and FIG. 19, the second component 22 of the main part 20 is omitted. As shown in FIG. 18, the end part 51 of the connector 5 on the fan motor 3 side is fit into the mounting hole of the third component 23 and arranged inside the main part 20. Further, the third component 23 of the present example is provided with a wall part 231 which adjoins the end part 51 of the connector 5. As will be understood from FIG. 18 and FIG. 19, the end part 51 of the connector 5 is positioned on the opposite side of the fan motor 3 across the wall part 231 of the third component 23. Therefore, the soldered part of the end part 51 of the connector is isolated from the air blowing path of the fan motor 3 by the wall part 231. Due to this, it is possible to prevent the cutting fluid or its mist carried by the cooling air of the fan motor 3 from causing damage to the soldered part. Therefore, it is possible to prevent the cutting fluid from causing insulation degradation of the fan motor 3, and as a result it is possible to improve the reliability of the fan motor 3. The third component 23 of the wall part 231 can be easily formed, for example, by bending various metal materials.

EFFECT OF THE INVENTION

According to the first and the eighth aspects of the present invention, the fan motor is attached to the electric motor by means of a main part of a cover which houses the electric motor, and an abutting part which forms an air blowing gap between the main part and the electric motor. Therefore, according to the first and the eighth aspects, it is possible to prevent the vibration of the electric motor from being directly transmitted to the fan motor and thereby prevent vibration of the electric motor from causing damage to the fan motor.

According to the second and the eighth aspects of the present invention, it is possible to prevent the flow of cooling air of the fan motor from being interrupted by the abutting part, which is provided on the cooling device.

According to the third and the eighth aspects of the present invention, it is possible to eliminate the need for the step of forming the abutting part on the cover of the cooling device separately from the main part, and the step of joining the abutting part with the main part, and therefore it is possible to streamline the production process of the cover.

According to the fourth and the eighth aspects of the present invention, vibration of the electric motor is absorbed by the abutting parts, and therefore it is possible to suppress propagation of vibration from the electric motor to the fan motor.

According to the fifth and the eighth aspects of the present invention, the second component in the main part of the cover of the cooling device can be detached from the first component so as to expose the inside space of the first component, and therefore it is possible to simplify the process for attaching the cooling device to the electric motor.

According to the sixth and the eighth aspects of the present invention, the soldered part of the lead wire of the fan motor is doubly covered by the insulating tube and the insulating material part, and therefore it is possible to prevent foreign matter which enters the inside of the cooling device from causing insulation degradation of the fan motor.

According to the seventh and the eighth aspects of the present invention, the soldered part of the lead wire of the fan motor is isolated from the air blowing path of the fan motor, and therefore it is possible to prevent foreign matter which is carried by the blown air of the fan motor from causing insulation degradation of the fan motor.

The present invention is not limited to only the above embodiments and can be modified in various ways within the range described in the claims. Further, the dimensions, shapes, materials, etc., of the above-mentioned parts are just examples. Various dimensions, shapes, materials, etc., may be employed for achieving the effects of the present invention.

The invention claimed is:

1. A cooling device for an electric motor, comprising:
   a cover which is detachably attached to the electrical motor and has a cylindrical-shaped main part which houses the electric motor, and
   a fan motor which is attached to said main part so as to blow air to the inside of said main part, and
   a connector which is attached to said main part of said cover, and is connected to a power supply source of said fan motor, wherein
   said cover further has an abutting part formed from a vibration absorbing material, which protrudes from an inside surface of said main part and abuts against the electric motor,
   said abutting part forms a gap for blowing air between said main part and said electric motor,
   said main part comprises a first component which corresponds to part of the cylindrical shape in the circumferential direction, and to which said fan motor is attached, and a second component which is detachable from said first component in a detachment direction perpendicular to an extension direction of a drive shaft of the electric motor, and corresponds to the remaining part of the cylindrical shape in the circumferential direction,
   said abutting part is provided on both said first component and said second component, and is provided on each of four sections of the main part which are defined by a first plane which includes an axis line of said drive shaft and is parallel to the detachment direction, and by a second plane which includes said axis line and is perpendicular to said first plane, said abutting parts are arranged symmetrically with said first plane and with said second plane, and said main part is fastened to the electric motor only by a contact surface pressure which acts from said abutting parts on an outside periphery of the electric motor.

2. The cooling device for an electric motor according to claim 1, wherein said connector has a soldered part which joins an end part of a lead wire extending from said fan motor to said connector, an insulating tube for covering said soldered part, and an insulating material part for further covering said insulating tube.

3. The cooling device for an electric motor according to claim 1, wherein said connector has a soldered part which joins an end part of a lead wire extending from said fan motor to said connector, and said main part has a wall part which isolates said soldered part from an air blowing path of said fan motor.

* * * * *